United States Patent
Johansson et al.

(10) Patent No.: US 10,743,128 B1
(45) Date of Patent: Aug. 11, 2020

(54) SYSTEM AND METHOD FOR GENERATING HEAD-RELATED TRANSFER FUNCTION

(71) Applicant: Genelec Oy, Iisalmi (FI)

(72) Inventors: Jaan Johansson, Iisalmi (FI); Aapo Karjalainen, Iisalmi (FI); Matti Malinen, Iisalmi (FI); Jussi Tikkanen, Iisalmi (FI); Ville Saari, Iisalmi (FI); Poorang Vosough, Iisalmi (FI)

(73) Assignee: Genelec Oy, Iisalmi (FI)

( * ) Notice: Subject to any disclaimer, the term of this patent is extended or adjusted under 35 U.S.C. 154(b) by 0 days.

(21) Appl. No.: 16/435,613

(22) Filed: Jun. 10, 2019

(51) Int. Cl.
    *H04S 7/00* (2006.01)
    *H04R 5/033* (2006.01)
    *G06K 9/00* (2006.01)
    *H04R 5/04* (2006.01)

(52) U.S. Cl.
    CPC .......... *H04S 7/304* (2013.01); *G06K 9/00248* (2013.01); *H04R 5/033* (2013.01); *H04R 5/04* (2013.01); *H04S 2420/01* (2013.01)

(58) Field of Classification Search
None
See application file for complete search history.

(56) References Cited

U.S. PATENT DOCUMENTS

| | | |
|---|---|---|
| 9,544,706 B1 | 1/2017 | Hirst |
| 2012/0201405 A1* | 8/2012 | Slamka ................... H04S 7/306 381/307 |
| 2017/0272890 A1* | 9/2017 | Oh .......................... H04S 7/304 |
| 2018/0132764 A1* | 5/2018 | Jain ......................... H04S 7/301 |

FOREIGN PATENT DOCUMENTS

WO    WO2018063522 A1    4/2018

OTHER PUBLICATIONS

Duraiswami et al: Interpolation and range extrapolation of HRTFS. 2004 IEEE, Acoustics, Speech and Signal Processing, Aug. 30, 2004.
Gumerov et al: Computation of the head-related transfer function via the fast multipole accelerated boundary element method and its spherical harmonic representation. Journal of Acoustical Society of America AIP, Jan. 5, 2010.
Huttunen et al: Rapid generation of personalized HRTFs. AES 55th International Conference, Aug. 14, 2014.

\* cited by examiner

*Primary Examiner* — Kenny H Truong
(74) *Attorney, Agent, or Firm* — Laine IP Oy

(57) ABSTRACT

According to an example aspect of the present invention, there is provided a method comprising: calculating a head-related transfer function for a user, the calculation based at least in part on gathered data comprising at least video material and at least one supplemental image, the at least one supplemental image comprising an image of a transparent measurement device superimposed over at least one biological detail of an user, and transmitting said head-related transfer function.

18 Claims, 10 Drawing Sheets calculating, by a first computer program application, a head-related transfer function for a user, the calculation based at least in part on gathered data comprising at least video material and at least one supplemental image, the at least one supplemental image comprising an image of a transparent measurement device superimposed over at least one biological detail of an user — 501 transmitting said head-related transfer function — 502

FIG. 10

SYSTEM AND METHOD FOR GENERATING HEAD-RELATED TRANSFER FUNCTION

FIELD

This disclosure provides a method comprising: calculating, by a first computer program application, a head-related transfer function for a user, the calculation based at least in part on gathered data comprising at least video material and at least one supplemental image, the at least one supplemental image comprising an image of a transparent measurement device superimposed over at least one biological detail of an user, and transmitting said head-related transfer function in particular in the field of audio engineering applications.

More specifically, the present disclosure provides a system and method for generating personal head-related transfer functions. The disclosure also comprises computer program applications and kits comprised of measurement devices usable to obtain the head-related transfer function based on a user's biological data as well as other data which may affect the transfer function. In addition, audio hardware is provided which implements the head-related transfer function without the need for user calibration.

BACKGROUND

The purpose of audio monitoring is to evaluate audio presentations in a neutral way to ensure good translation to other reproduction systems. The head and outer ear shapes with head movements, the main localization mechanisms of our auditory system, provide our wonderful ability to localize sound sources and enable loudspeaker monitoring to work. Headphones break the link to these natural mechanisms we have acquired over our lifetime. Because of these reasons on-ear and in-ear headphones have not been the best choice for monitoring. Normal headphones make it difficult to set levels, pan sound locations and equalise important sources, like the human voice or tonal instruments, because headphones do not have well-controlled frequency responses in the midrange and headphone-to-headphone sound character variation is large. This matter is complicated by individual differences between persons. What you hear on headphones can be quite different from what the other persons hear, even with the same set of headphones. These characteristics are entirely different in comparison to good in-room monitoring loudspeaker systems. Work done using good loudspeaker monitoring systems translates precisely to other loudspeakers and sounds the same for all listeners, and also works well on headphone reproduction.

To allow for monitoring using headphones, new solutions are needed. The present disclosure aims to provide a reliable path to enable stereo, surround and immersive audio monitoring using headphones. In embodiments of the present disclosure, calculations on how a user's head, external ear and upper body affect and colour audio arriving from any given direction. This effect is called the Head-Related Transfer Function (HRTF). At least some of the embodiments of the present disclosure provide the user's unique personal HRTF in the SOFA file format. The SOFA (Spatially Oriented Format for Acoustics) file format has been standardized by the Audio Engineering Society (AES) and is widely accepted and supported by audio software.

There are methods of offering HRTFs that use data not uniquely measured from the person in question. Such data may come from a mannequin or a dummy head. Typically, these solutions do not result in the best quality, i.e. the generated HRTF does not match the user anatomy very well. It is understood that a poor quality HRTF is not useful for the user and can actually result in lower fidelity, such as HRTFs including sound colourations and localization inaccuracy as well as localization errors.

There is also data available in databases and originally measured from totally different persons. Previous methods have comprised devices for selecting the best match in such databases. Such selection is usually based on measuring a set of dimensions in the person, such as the size of the head and dimensions of the ear, commonly called anthropometrics. Anthropometric data of the target person can be matched to data from other persons in a database, with the intention of finding the best match. The assumption is that this would result in selecting a HRTF most likely to create correct presentation of audio for the given person. Unfortunately, such methods do not show very good performance in reality. Often problems with unwanted coloration, localization errors and lack or creating good externalization are seen, but this typically does not result in reliable rendering as there are still significant individual differences and perfect selection methods do not exist yet.

The present invention aims to solve the problems as well as the drawbacks of the solutions presented herein as well as providing advantageous effects as disclosed herein.

SUMMARY OF THE INVENTION

The invention is defined by the features of the independent claims. Some specific embodiments are defined in the dependent claims.

According to a first aspect of the present invention, there is provided calculating, by a first computer program application, a head-related transfer function for a user, the calculation based at least in part on gathered data comprising at least video material and at least one supplemental image, the at least one supplemental image comprising an image of a transparent measurement device superimposed over at least one biological detail of an user, and transmitting said head-related transfer function.

According to a second aspect of the present invention, there is provided an apparatus comprising at least one processing core, at least one memory including computer program code, the at least one memory and the computer program code being configured to, with the at least one processing core, cause the apparatus at least to: calculate a head-related transfer function for a user, the calculation based at least in part on gathered data comprising at least video material and at least one supplemental image, the at least one supplemental image comprising an image of a transparent measurement device superimposed over at least one biological detail of an user, and transmit said head-related transfer functions.

Various embodiments of the first and/or second aspect may comprise at least one feature from the following bulleted list:
  gathering data related to a user,
  data related to a user, comprising at least one of:
    video material,
    at least one supplemental image,
    auditory measurement data,
    user metadata.
  at least one supplemental image gathered from the user, comprising an image of a transparent measurement device superimposed over at least one biological detail of an user, transmission of data related to a user by at least one computer program application, receiving of data related to a user by at least one computer program application, usage of a computer program application, calculation of at least one head-related transfer function for a user, the calculation based at least in part on said gathered data, transmission of at least one head-related transfer function to at least one computer program application, loading of the head-related transfer function into at least one audio device, provision of an audio device comprising a head-related transfer function to the user the head-related transfer function is based upon, headphones comprising a head-related transfer function, usage of an autonomous device is used to gather the data related to the user, provision of contextual instructions during the data gathering process, for example using a computer program application data comprising metadata relating to the user, separate transmission of metadata to a computer program application from the video material and supplemental images, data comprising at least one supplemental image of the user's left ear and at least one supplemental image of the user's right ear calculation of the head-related transfer function in the time domain by solving at least one wave equation, calculation of the head-related transfer function in the frequency domain by solving at least one Helmholtz equation.

BRIEF DESCRIPTION OF THE DRAWINGS

FIG. 10 is a flow graph illustrating an exemplary method in accordance with at least some embodiments of the present invention.

EMBODIMENTS

In this disclosure a system and method for generating head-related transfer function is presented. The disclosure also comprises computer program applications and kits comprised of measurement devices usable to obtain the head-related transfer function of a target user, based on the information of the precise shapes of at least a user's head, external ears, and upper parts of the torso, which are known to affect the HRTF, as well as other data which may affect the transfer function. In addition, audio hardware is provided which implements the head-related transfer function without the need for user calibration.

Head-Related Transfer Function (HRTF) is a filter for each ear separately, and with different value for each direction of arrival on the horizontal plane (azimuth) and vertical plane (elevation), incorporating all spectral and time-domain effects. HRTF describes all changes to the sound produced by the sound approaching an ear from a given orientation. To create complete understanding of the directional effects to sound a large number of HRTFs are required, for all the directions of arrival over a sphere surrounding the listener's head. When the HRTF information is expressed in the time domain, the result is the Head-Related Impulse Response (HRIR).

Figure 1:
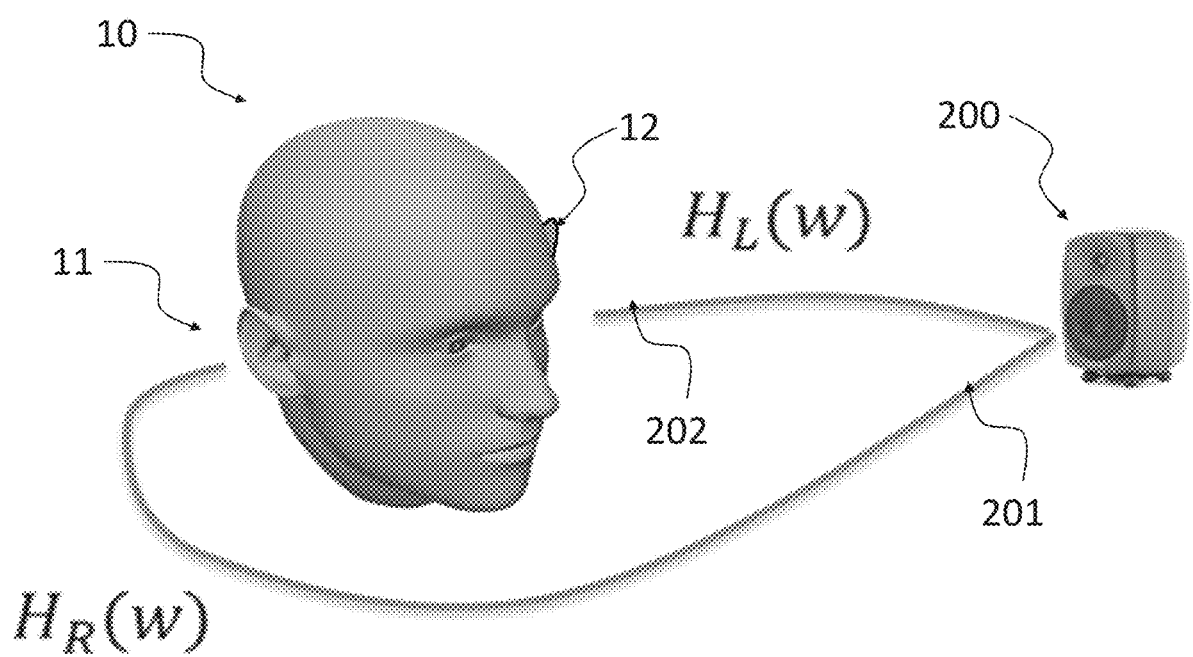
FIG. 1 illustrates a schematic view of an example of an user and an audio source emitting sound heard by the at least one ear of the user, in accordance with at least some embodiments of the present invention.

FIG. 1 depicts a user 10 having two ears, the left ear 12 and the right ear 11. Sound emitted by the sound source 200 is heard by both ears, sound 202 by the left ear and sound 201 by the right ear.

Spatially Oriented Format for Acoustic (SOFA) is an internationally standardized file format for storing multiple HRTFs. In this disclosure, the output SOFA file may comprise for example HRIR data for both ears given in 836 different directions of arrival for the audio signal. The HRIR impulse responses are 1024 samples long and use the sampling rate 48, 44.1 or 96 kHz, depending on the user preference. The azimuth angular resolution in the file depends on the elevation and is given in Table 1. The highest azimuth resolution is at small elevations where the human hearing system also has the highest angular resolution.

TABLE 1

| Elevation | Azimuth resolution | Details |
|---|---|---|
| ±90° | 360° | direct up and direct down |
| ±80° | 30° | |
| ±70° | 15° | |
| ±60° | 10° | |
| ±50° | 8° | |
| ±40° | 6° | |
| ±30° | 6° | |
| ±20° | 5° | |
| ±10° | 5° | |
| 0° | 5° | on the ear level, in front of the user |

In at least some of the embodiments of the present disclosure, a system is provided to facilitate the measurement, calculation and delivery of the personalized head-related transfer function to at least one end-user. Such a system may comprise at least at least one first computer program application, which comprises functions which, based on the user-provided data, calculate, obtain and package the head-related transfer function into at least one desired file format and deliver said file formats to the user. The system may also comprise a second computer program application, which comprises functions which assist the user in taking the measurements and sending the measurements to the first computer program application. The user may then utilize the second computer program application to securely obtain the file format, or, in an alternative embodiment, a separate third computer program application may be used.

The HRTF is usable with any form of audio equipment such as: headphones, earphones, loudspeakers, subwoofers, bone conductive audio devices, hearing aids, PA systems, amplifiers, preamplifiers, monitors, television, mobile phones, tablets, smartwatches.

In accordance with at least some of the embodiments of the disclosure, material will be required of the details of the end-user, i.e. the person of whom the head-related transfer function is generated of. This material may be referred to herein as the user data, user material, or other such terms. This material may obtained, for example, by using the first computer program application, optionally in conjunction with elements of an operating system of a computing device comprising the second computer program application. For example, the second computer program application may comprise at least one mobile phone application.

The required user material may comprise still images and/or video, i.e. image sequences. Additionally, the user data may comprise audio, such as a test signal or timing signal used for processing the images. The images or audio data may be included as part of a video or recorded separately. In an exemplary embodiment the image material is preferably at least 720×920 pixels, more preferably 1920× 1080 pixels. The image material preferably comprises a visual representation of the user biology comprising at least some of the following: head, shoulders, torso, neck, face, ears, nose. Regarding the ear of the user, the outer ear biology is important, including the shape and dimensions of the pinna and the ear canal. The sound perceived by the user is affected by at least some of the following biological data (biological details): ear shape, ear size, head shape, head size, shoulder size, shoulder shape, size and shape of oral cavities and nasal cavities, as well as the distances between the previously mentioned body parts and other biological details. Therefore it is advantageous to have visual records of the user torso and shoulders in addition to the head. In at least one exemplary embodiment, the image material comprises visual representation of the open mouth of the user to obtain information relating to the dental status of the user, e.g. if teeth are missing. Such information is usable to adjust the head-related transfer function in the calculation phase to obtain a more accurate model. In addition, it is beneficial to have images of each side of the user's head, comprising the ear, as the user may have been subjected to trauma resulting in different biological details for each head side.

Figure 2:
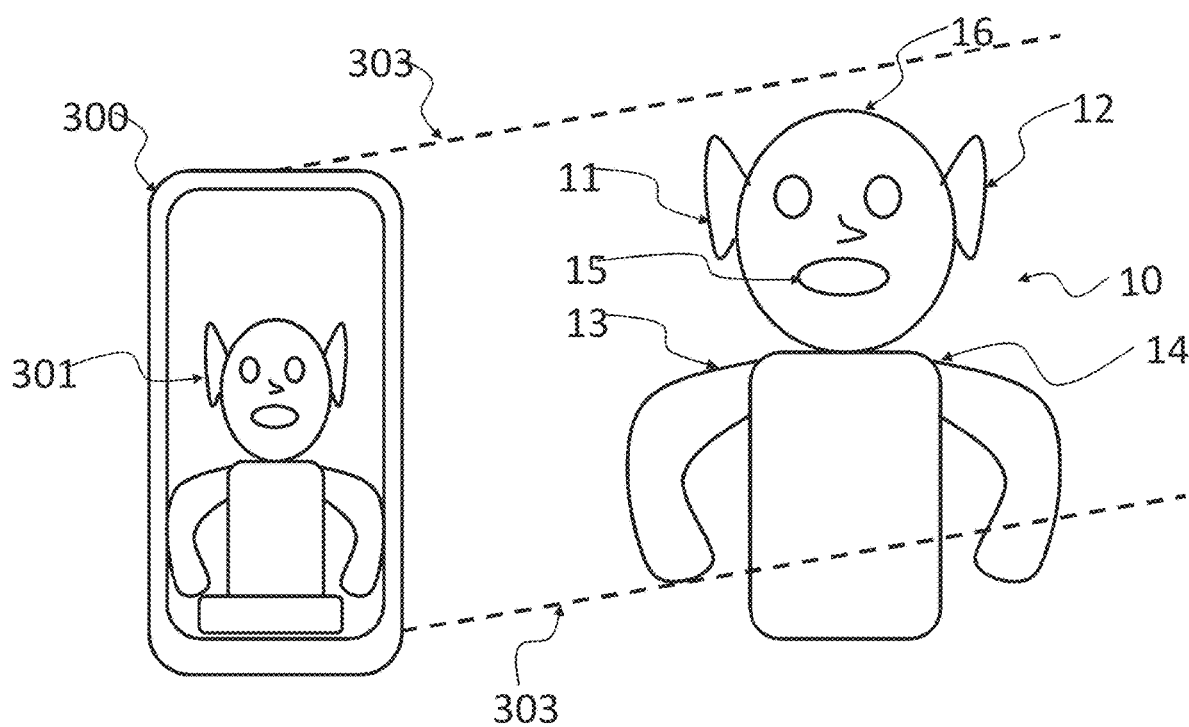
FIG. 2 illustrates a schematic view of an example data capture method which involves acquiring a visual representation of the user, in accordance with at least some embodiments of the present invention.

FIG. 2 shows the user 10 being subjected to video capture in accordance with at least some embodiments of the present disclosure. User 10 has a head 16 comprising: ears 11 and 12, mouth 15. User 10 also comprises neck 18, shoulders 13 and 14. The user biology elements 11, 12, 13, 14, 15 and 16 are being recorded by recording device 300. Recording device 300 comprises at least one video capture device such as a camera, said camera having a field of view illustrated by lines 303. A visual representation 301 of the user is therefore captured and additionally shown. Visual representation 301 beneficially comprises all of the user biology elements 11, 12, 13, 14, 15, 16, 18 for use in the HRTF generation process. In accordance with the disclosure, this embodiment as well as other embodiments, which may utilize at least one different data acquisition method, comprises capturing a visual representation 301 of the user.

Figure 3:
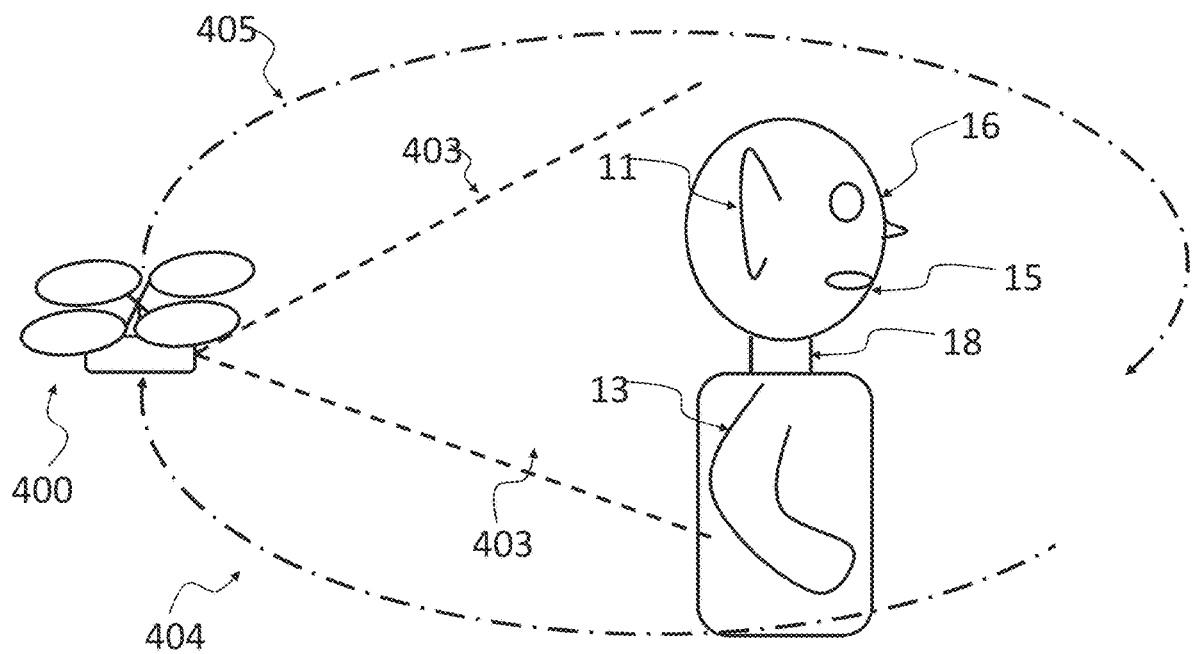
FIG. 3 illustrates a schematic view of an example data capture method which involves acquiring a visual representation of the user, further utilizing an autonomous device, in accordance with at least some embodiments of the present invention.

FIG. 3 shows the user 10 being subjected to video capture in accordance with at least some embodiments of the present disclosure. In this figure the video capture is performed by autonomous device 400, depicted here as an airborne drone. As can be seen from the figure, the video capture being taken from a side orientation of the user. The autonomous device is following a path comprised of paths 404 and 405. Taken together, the paths 404 and 405 may describe a circle, oval, or other geometric shape. The autonomous device is therefore circling the user 10, while beneficially oriented so that the camera field of view 403 is pointed toward the user. At the same time as the circling is happening, the device 400 is recording the user 10 continuously, so that the video captured by device 400 will comprise video frames with visual representations of the user biology from different sides of the user. For example, the user's left ear 11 may be shown in 1000 video frames, wherein the first 200 frames show a view of said ear from the facial direction, gradually transitioning into a side (direct) view of the ear, which may comprise frames 201-800, after which the remaining frames show the ear from the rear direction. Said frames may be usable for specific details such as ear and shoulder details as well for determining the overall dimensions, i.e. the respective dimensions of the user, e.g. the distance from the ear to the shoulder.

In a further exemplary embodiment, the device path may have changes in altitude and the device may cross over the head of the user to obtain photographical material of the user biology from an elevated angle, such as directly above the head. In a further exemplary embodiment, instructions as disclosed within this disclosure may be provided to the user when using an autonomous device for material capture. In a further exemplary embodiment, the autonomous device may first indicate to the user to position the measurement device over their ear and then adjust position to capture a supplemental image. In accordance with at least some embodiments of the disclosure, paths 404 and 405 incorporate stops at predetermined orientations, for example every ninety degrees or every 60 degrees to minimize the effects of motion blur on the captured images.

Figure 4:
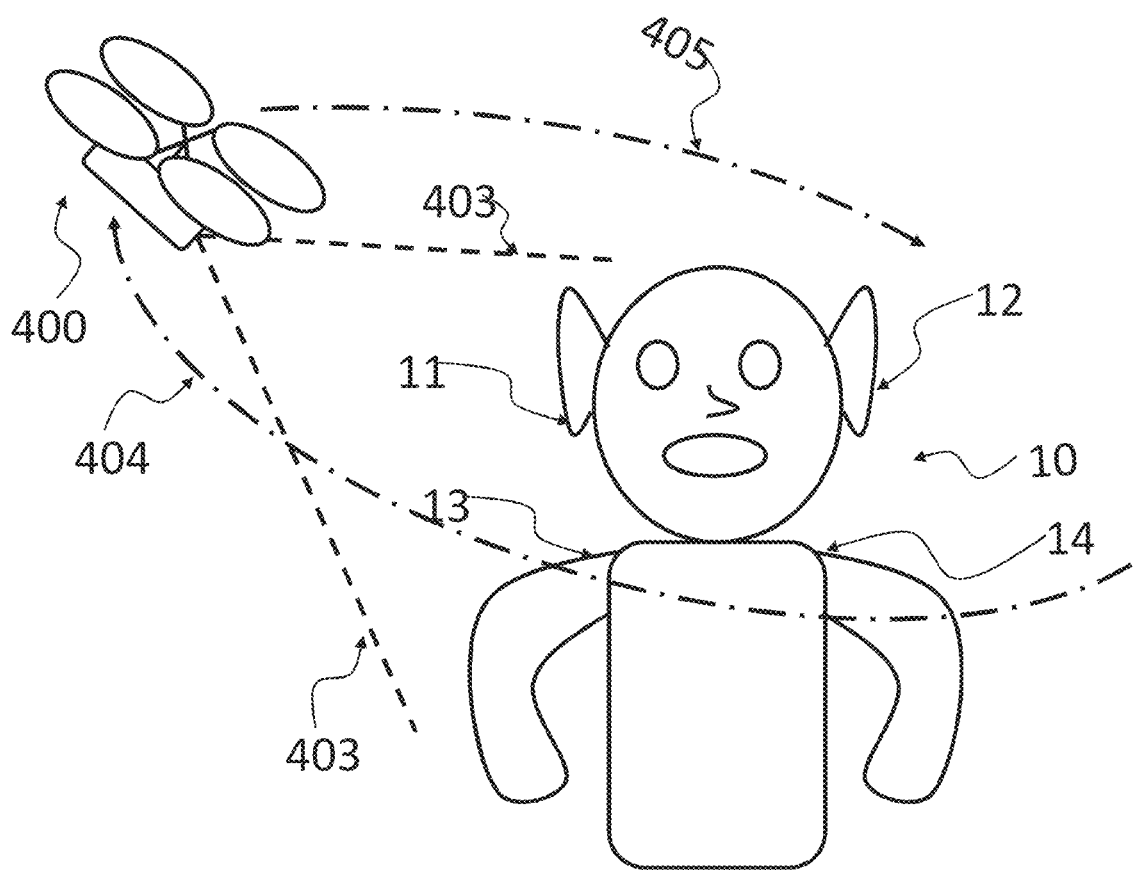
FIG. 4 illustrates a schematic view of an example data capture method acquiring a visual representation of the user, further utilizing an autonomous device, in accordance with at least some embodiments of the present invention.

FIG. 4 shows the user being subjected to video capture by autonomous device 400 traveling on paths 404 and 405 capturing the image defined by field of view limits 403. The paths are at an angle towards the user, allowing the device to capture more of the important details of the user head biology. In an exemplary embodiment, the path taken by the device may resemble a double helix, i.e. all of the sides of the user are captured from at least two orientations which provides increased geometry data for the HRTF calculation.

The first computer program may comprise displaying, transmitting or emitting visual, auditory, textual or haptic instructions to aid in the capture process. Instructions are beneficially provided as contextual instructions, e.g. based on the current user situation. Context of the instructions may be derived by the first or second computer program application based on the gathered data, the user location, the orientation or movement of the gathering device. For example if the lighting of the user data is insufficient, this may be indicated to the end-user by a warning tone. In at least one exemplary embodiment, the provision of the contextual instructions is determined by the at least one first computer program application based on data communicated to the first computer program application from the second computer program application. Further, the first or second computer program may comprise analysis functions of the user data to perform initial sanity checks of the user data, in order to avoid unnecessary data transmission. The first or second computer program may additionally comprise encryption and compression functions for securing the user material and reducing the amount of data to be transferred, respectively.

The second computer program may comprise sensing the orientation and movement of the computing device and storing said orientation and/or movement information along with the image material for use in generating the head-related transfer function. Image stabilization may be utilized. In an exemplary embodiment, the user data is captured using an autonomous flying device such as a drone. The drone path may be preprogrammed into the second computer program and, responsive to sanity checks as detailed above, the drone may be instructed by the second computer program to recapture certain data, for example data which has been determined to be of low quality.

To increase the accuracy of the head-related transfer function, the measurement process may utilize specific measurement devices. A measuring device may comprise a scale such as at least one of the following: a metric length scale, a predetermined pattern, reflective portions, components such as LEDs, information stored visually such as bar codes and QR codes. A measuring device may comprise positioning aids such as at least one of the following: hooks, guides, fixtures, clamps, bands, adhesive. In an exemplary embodiment, the measurement device comprises information stored in at least one machine-readable format and at least one human-readable format, so that the data does not have to be interpreted by the human to the machine and/or vice versa. Machine-readable data may also be stored in a format easily understandable by humans, such as in a textual format, wherein the computer program applications described herein then perform or cause Optical Character recognition (OCR) to be performed in order to read the data. In an exemplary embodiment, at least one measurement device may be transparent, i.e. comprised of optically transparent material. This is beneficial as the measurement device may be placed over a body part of the user and the resulting image will display the measuring device superimposed on the user's body part. In a further exemplary embodiment, the position of the measuring device may be analyzed by the first or second computer program application during the data acquisition and any required corrections of the position may be communicated to the user via contextual instruction, e.g. via audio instruction as the user may be preoccupied while holding the measurement device.

Figure 5:
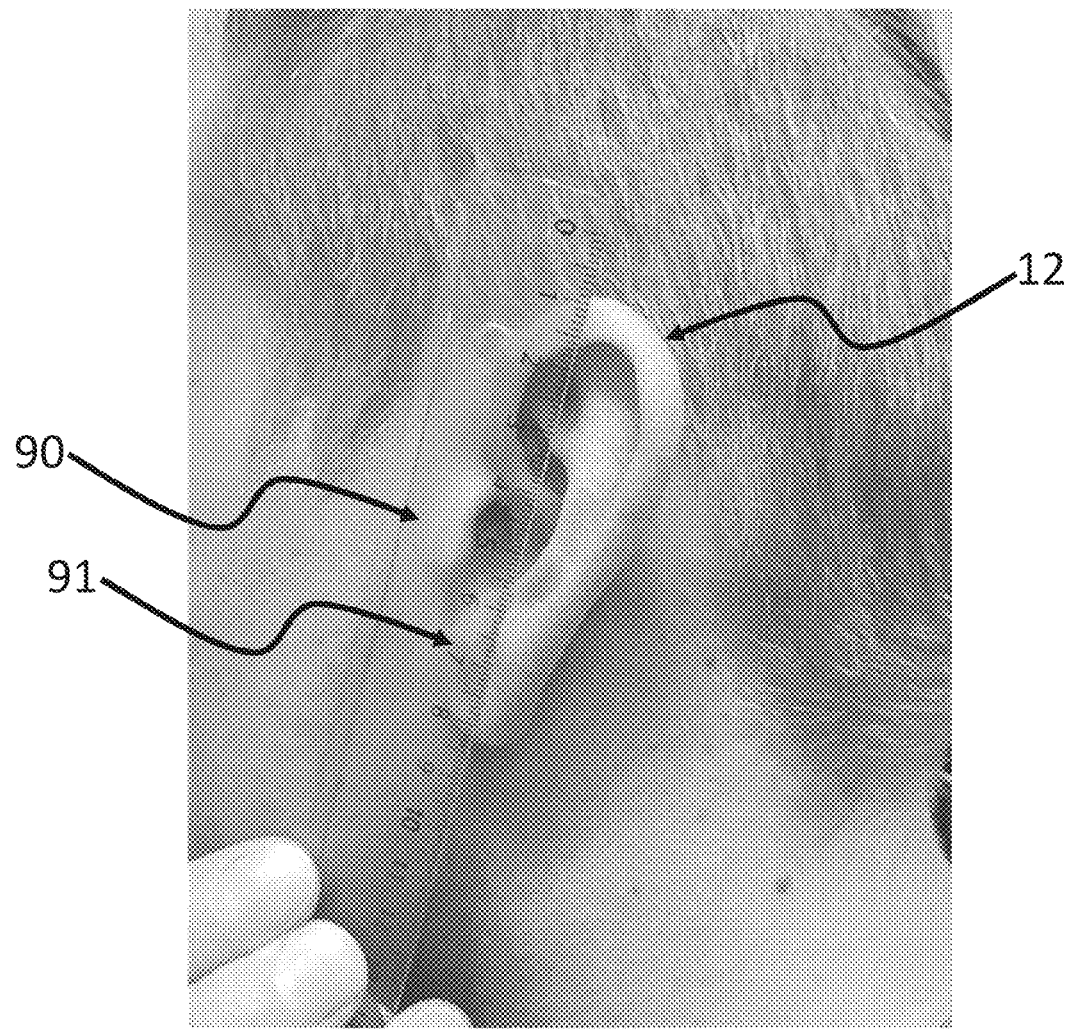
FIG. 5 illustrates a schematic view of an example measurement device usable in acquiring biological details of the user, in accordance with at least some embodiments of the present invention.

FIG. 5 shows the use of a measuring device in accordance with at least some embodiments of the invention. In an image taken of the user's ear 12, measuring device 90 is shown superimposed on the ear 12. Measuring device 90 comprises scale 91, which is machine-readable. Use of such a transparent measuring device provides the benefit of easy dimensioning of the user biology features such as the pinna dimensions, by use of pixel-based calculations with the scale as a reference feature.

Figure 6:
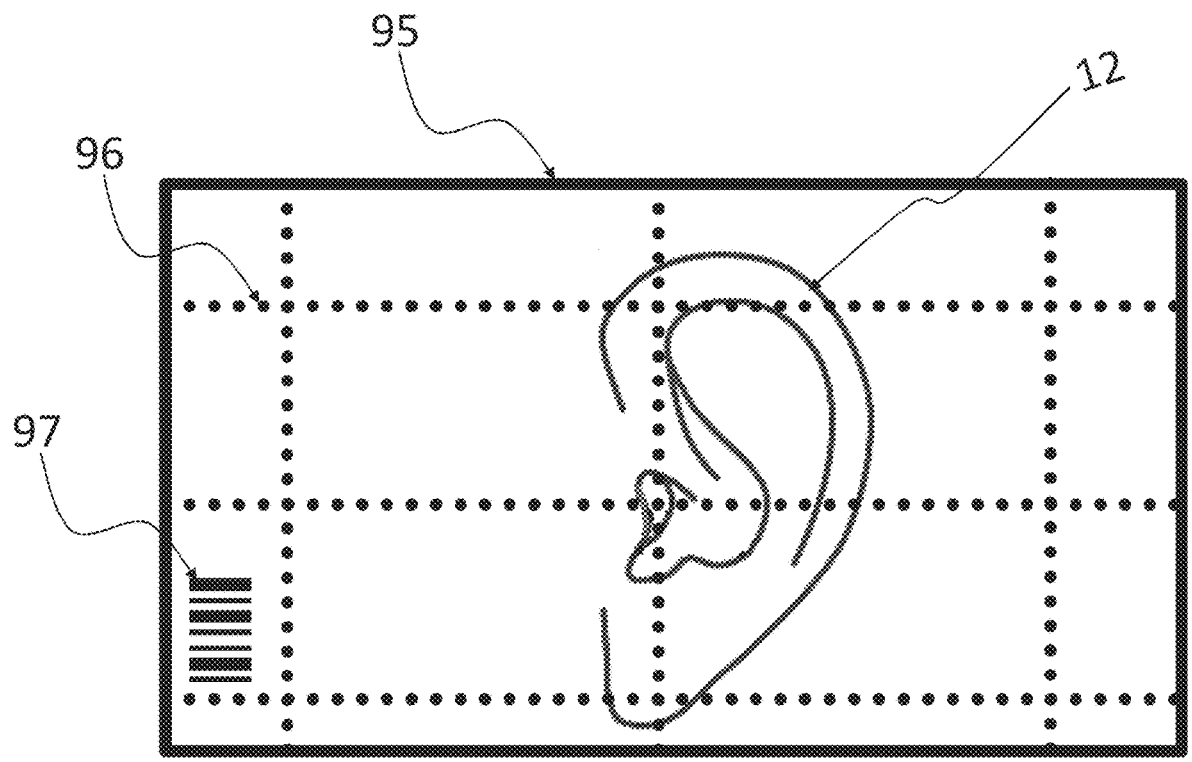
FIG. 6 illustrates a schematic view of an example measurement device usable in acquiring biological details of the user, in accordance with at least some embodiments of the present invention.

FIG. 6 shows another type of transparent measurement device 95 superimposed over the user ear 12. Measurement device 95, as well as the other measurement devices disclosed herein, may be manufactured out of plastic materials such as e.g. ABS or polyethylene. Measurement device 95 comprises machine-readable scale 96 and identification means 97, represented as a barcode. The position and orientation of scale 96 and identification means 97 allow for rapid analysis of the user biology. The measurement device 95 may be pressed lightly against the user ear 12 to ensure no perspective effects hamper the data gathering.

In an exemplary embodiment, the second computer program and the measurement devices are provided as a kit. The kit may comprise at least one transparent measurement device. In a further exemplary embodiment, the kit may comprise at least one of the following: lighting devices, conduction measurement devices, microphones, headphones, optically opaque measurement devices for use as e.g. a background or backdrop. At least some of the measurement devices in accordance with the present disclosure may be configured to be temporarily attached to at least one body part of the user. At least some of the measurement devices may comprise articles of clothing such as a hat, a headband, a shirt. At least some of the devices provided within the kit may beneficially be configured to accept HRTFs, such as the HRTF generated based on the user measurement. In at least one exemplary embodiment, the kit may comprise access codes which allow the user to transmit data to the first computer program application.

In at least some embodiments of the present disclosure, data is collected from the user in addition to the above-mentioned image and audio data. This data, called metadata in the context of this disclosure, may comprise the identity of the user, i.e. at least one of: a name of the user, an alias of the user, a biometric identification of the user such as a fingerprint, an age of the user, a biological gender of the user. Said data may also comprise geographical data related to the user, the geographical data comprising at least one of: the user location, the atmospheric pressure at the user's location (measured, obtained or input manually by the user), the humidity at the user's location, the temperature at the user's location. Such data is beneficial for generating the head-related transfer function as the audio experienced by the user is impacted by biological factors such as age and bone conductivity as well as locational factors such as humidity. The metadata may be collected as part of the image data, for example the user may communicate the data onto the audio track of the video. The metadata may at least in part be collected by the device comprising the second computer program application using sensor data, or be obtained from other sources prior or after the measurement event by the first or second computer program from one or more databases and/or computer systems which, in at least some embodiments, do not comprise the second and/or the first computer program application.

Figure 7:
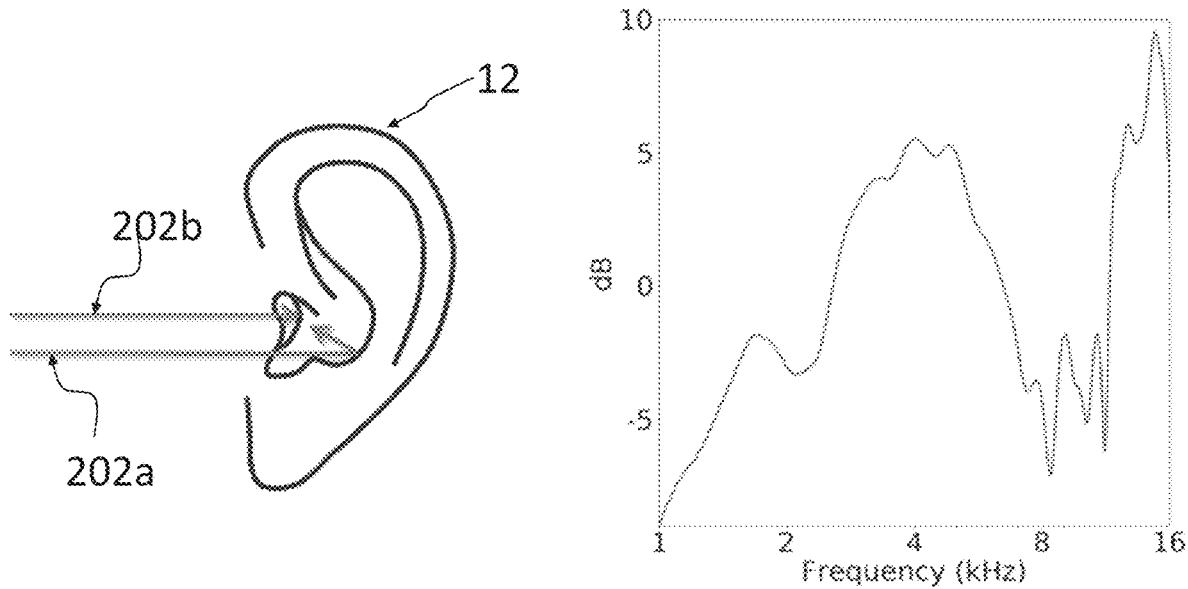
FIG. 7 illustrates a schematic view of a user ear interacting with audio interacting in different ways with the user biology in accordance with at least some embodiments of the present invention.

FIG. 7 shows the effect of arriving sound on the user ear 12. Sound 202b arrives directly into the user ear canal, while sound 202a is reflected of the surface of the user ear, more precisely from the concha of the user. The corresponding effect on the audio experienced by the user is shown in the frequency graph included in the figure.

Figure 8:
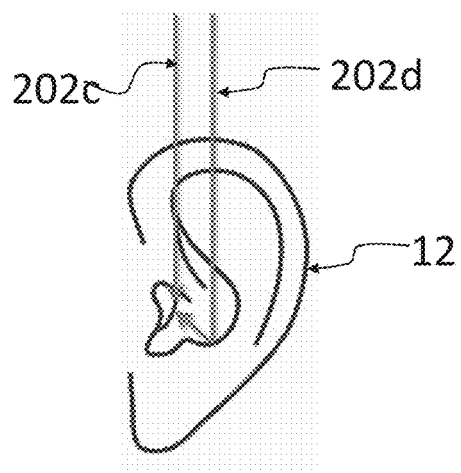
FIG. 8 illustrates a schematic view of a user ear interacting with audio interacting in different ways with the user biology in accordance with at least some embodiments of the present invention.
Figure 8:
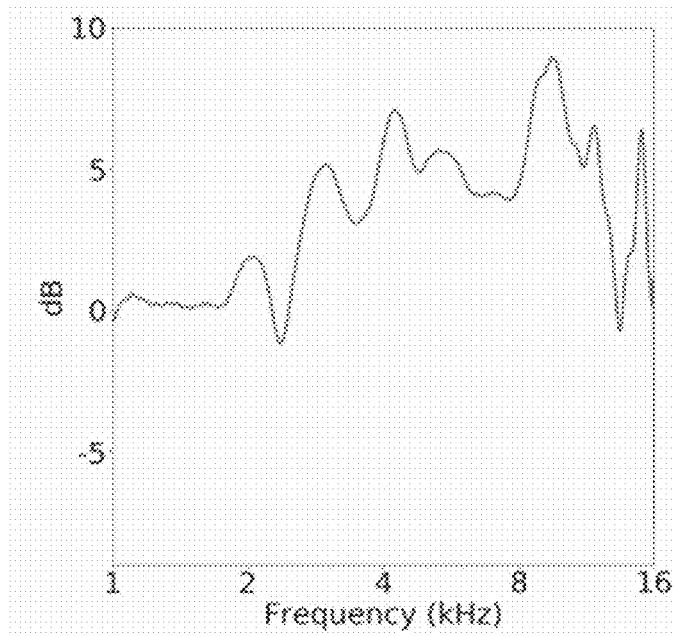

FIG. 8 shows another situation, wherein the sounds 202c and 202d arrive from above the ear. Sound 202c arrives directly into the user's ear canal, whereas sound 202d is reflected of the surface of the ear into the ear canal. The corresponding effect on the audio experienced by the user is shown in the frequency graph included in the figure. The situations shown in FIGS. 7 and 8 are of an exemplary nature and typical simulations comprise tens to hundreds of such simulations superimposed to obtain results. The situations described herein with respect to FIGS. 7 and 8 may be used as part of the calculation to obtain the HRTF, or alternatively or additionally, to correct at least some portion of the HRTF, e.g. a frequency range, after the HRTF generation. The situations shown in FIGS. 7 and 8 are also presented herein the effect of the user biology on the physical transmission of audio into the ear as well as to highlight the effects of such phenomena on the perceived audio, emphasizing the need for highly accurate HRTFs as presented within this disclosure.

In at least some embodiments in accordance with the present disclosure, the user aural receptivity is tested using at least in part the second computer program application. Such a test may comprise elements directed to testing air-conducted audio as well as testing bone-conducted audio. A test may comprise instructing at least one first device to emit a vibration, i.e. a first stimulus, and manually or automatically recording at least one first user response to the at least one first stimulus. In at least some embodiments of the present disclosure, the measuring equipment comprising the second computer program and optionally measurement devices may be in a different location from the user. In that case, the user may have a local instance of the first computer program which may indicate, directly or in response to a measurement of the user, that the user should go to the location of the measurement equipment to obtain a high quality measurement.

In accordance with the present disclosure, the calculation of the head-related transfer function is performed in the frequency domain by simulation of the acoustic pressure on the user's ear drum in accordance with the measured user biology and/or by using frequency domain acoustic field modelling. Input values for the simulation may be far field sounds, for example acoustic sources located 2 meters from the subject's head in a spheroid configuration. Obtaining the head related transfer function may incorporate the calculation of associated acoustic fields from each acoustic source to the subject's ear. Acoustic field calculation may be accomplished in subject's geometry by solving at least one wave equation in time domain and/or solving at least one Helmholtz equation in the frequency domain. Numerical solution of wave equation and/or Helmholtz equation can be made by one of the following: finite element method (FEM), finite difference/finite difference time domain method (FD/FDTD) or boundary element method (BEM) or their modifications and extensions, or by any other methods disclosed herein. If the acoustic field is solved and/or computed in the time domain, resulting pressure field in the subject's ear is directly the desired impulse response. If acoustic field is solved and/or computed in the frequency domain, a calculation such as e.g. inverse Fourier transform is used to obtain the desired impulse response. In addition, the calculation may utilize at least some of the following: frequency-swept sine wave or maximum length sequences. The transfer function may be calculated for at least the values listed in table 1 and interpolation as required or for a larger amount of directions, for example 836 directions.

In accordance with at least some embodiments of the present disclosure, prior to the calculation the user biology is modelled. Said modelling includes extracting the user biology geometry from the supplied material, optionally including the user metadata, as well as performing checks on the geometry, generating a 3D mesh and assigning ear channel entry points.

The generation of the HRTF may be further adjusted by weighting the input variables by using one or more weight vectors. For example, the pinna length may be weighted more than the distance from the ear to the shoulder of the user. Metadata and/or additional data from the user may be given more or less weight depending on the input data quality, the HRTF quality, and determination criteria as disclosed elsewhere within this disclosure.

In accordance with at least some of the embodiments of the disclosure, after the calculation or generation of the head-related transfer function, at least one quality metric may be calculated. The quality metric provides information on the estimated accuracy of the transfer function. The quality score may be calculated by comparing the obtained transfer function to transfer functions obtained based on at least one of the following: demographic values, cohort data, simulated head data, dummy head data. The quality score may be expressed in a percentage format.

In accordance with at least some of the embodiments of the disclosure, the head-related transfer function may be calculated or adjusted after calculation using the user metadata discussed previously within this disclosure. For example, the altitude of the user relative to sea level and/or the atmospheric pressure at the user's location may affect how the audio is conveyed to the ear channel of the user and therefore taking this factor into account will result in a more accurate transfer function. In another example, in certain situations the user might be obligated to wear a helmet or other headgear while experiencing the audio. Such equipment will also affect the sound conduction through the skull as well as the air and therefore it is beneficial for the model to take the geometry and material properties of the equipment into account. In yet another example, should the user use or plan to use certain audio equipment such as headphones, the design of the headphones including the material as well as the mechanical structure may be taken into account, similar to the other examples presented herein.

Therefore, the data relating to such conditions relating to the metadata of the user as well as the examples presented herein may be stored in the system as a weighted value table or a multidimensional matrix, for example. The at least one first or second computer program application may comprise preprogrammed instructions to utilize or apply these values, or the application may utilize the values if the quality score of the transfer function fails to meet a certain threshold, for example 50%.

In an advantageous embodiment, the head-related transfer function is provided to the user preloaded into at least one audio listening device such as a headphone or speaker. Such hardware may comprise at least one of the following: a driver element, a pre-processor comprising programmed instructions to perform at least some adjustments to the audio signal based at least in part on the head-related transfer function, an audio input means such as a cable jack, a wireless communication means such as a Bluetooth adapter. Upon receipt of the hardware, the hardware is therefore already customized to take into account the user's particular biology and conditions, saving the user's valuable time. The hardware may also be configured to download the head-related transfer function upon activation or user request.

Figure 9:
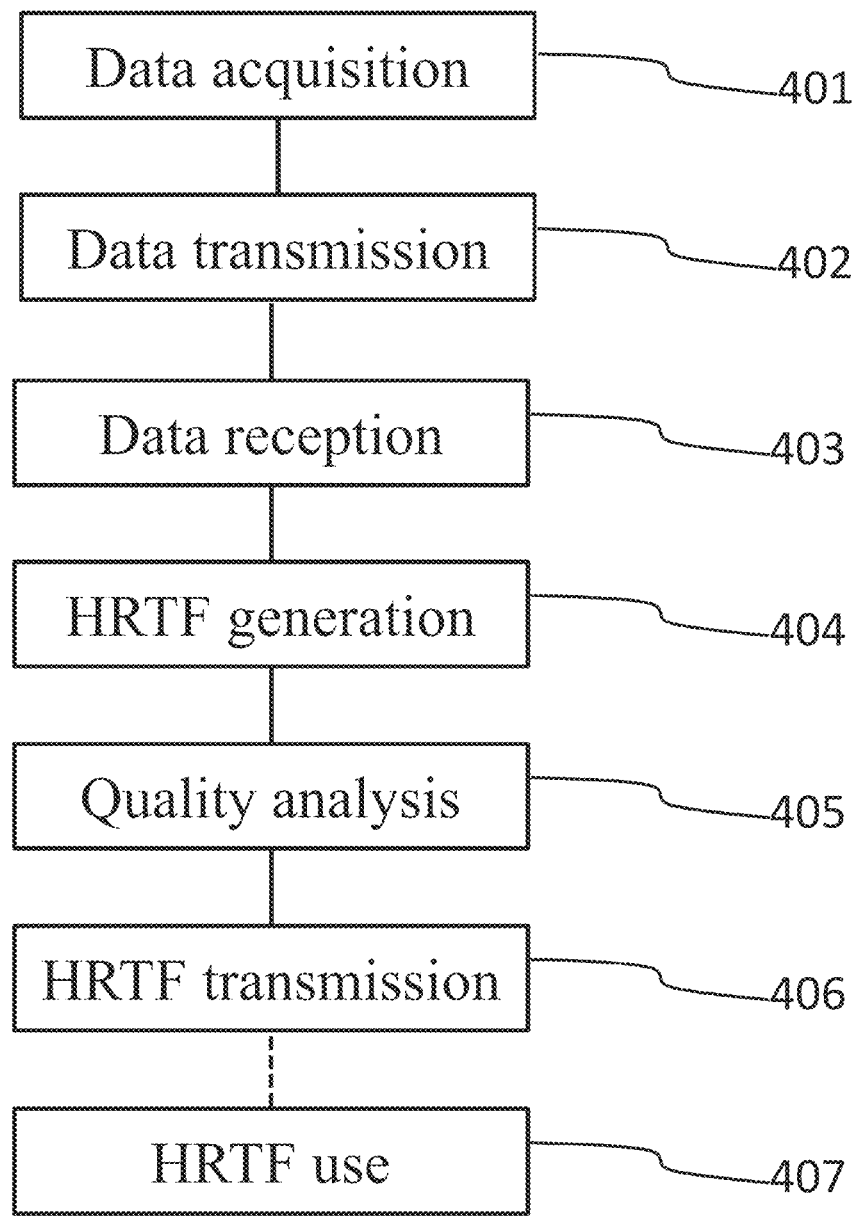
FIG. 9 is a flow graph illustrating an exemplary method in accordance with at least some embodiments of the present invention.

In a first method, shown in FIG. 9, in accordance with at least some embodiments of the present disclosure, a video is taken of the listener. This video includes the head and upper torso (shoulders) of the listener while the footage circles the listener, showing these details in all angles. After this, the calculation process analyses the video and builds a three-dimensional model of the listener using photogrammetric methods, by looking at the differences that occur between different images in the video. This model is then used in calculating the impact sound experiences when it arrives at the two ears from different orientations. Using this information, finally, the HRTF filters can be obtained in more than 800 different orientations of audio arrival.

In a first step of the first method, a video is taken of the user from all angles, starting from the front of the user and circling along to the back. An example of this step is shown in FIG. 3. During the video process, the user is stationary and the camera is moved by another person, by a drone, or by a gantry or support system. During the video process, the camera movement is stopped at points where the camera is directly facing the ears of the user and at the back of the head of the user. This has the beneficial effect of ensuring no motion blur is in the resulting images of these critical biological details. In certain embodiments, the user's mouth is open during the video process to gain dental information visually from the mouth cavity. The video process may be repeated several times in some of the embodiments in accordance with the present disclosure. During the video process additional sensor data may be captured, such as audio data, echo data, accelerometer data, lighting data.

In a second step of the first method, supplementary or supplemental images (still photos) are taken of the user. The supplementary images comprise details of the user biology as well as a measurement device in accordance with devices presented previously in this disclosure. The supplementary images are later used by the first computer program application to scale the details of the video material and may also be used for details relating to user biology, equipment, et cetera.

In a third step of the first method, additional data may be gathered, facilitated at least in part by the second computer program application. This gathering step may involve recording audio, measuring bone conduction, measuring vibration, weighing at least part of the user. It is to be understood that in accordance with the present disclosure, steps 1-3 of the method which form the data gathering process may be performed in a different order and in a further exemplary embodiment, in any order. Collectively, these steps may be termed the data collection phase and are shown as step 401 in FIG. 9. During these steps the second computer program application may provide at least one of the following: instructions or directions relating to the data gathering process, quality data relating to the data gathering process, communications with a person assisting in the data gathering process.

In a fourth step of the first method, the second computer program application automatically or responsive to a prompt or input of the user, prepares the gathered material for transmission to the first computer program application. The material may be subject to at least some of the following procedures: encoding, encryption, packaging into a single file, separation into multiple file, transmission, retransmission, verification. The procedures may be undertaken one or more times responsive to at least some of the following conditions: data size, data quality, network status, connection quality, connection technology, connection speed, payment status of user. In a further exemplary embodiment, the user metadata and the video data may be transmitted separately using at least one different procedure, condition, or connection to advantageously protect the user's personal details. For example the user's personal details may be encrypted using advanced encryption standard (AES*) and a first set of encryption keys and transmitted via a virtual private network, while the image data may be transmitted using a second set of encryption keys and transmitted over the Internet. The transmission step is shown as step 402 in FIG. 9.

In the fifth step of the first method, which may occur simultaneously with any of the steps 1-4 of the first method, the data is received and processed by the first computer program application. In at least some embodiments in accordance with the present disclosure, the data may be subject to at least some of the following procedures: Decoding, reverse compression, filtering, quality evaluation, indexing, normalizing, cross-referencing. Calculation and/or generation of the HRTF may be accomplished utilizing at least in part calculation methods or steps discussed elsewhere in this disclosure.

In the sixth step of the first method, additional adjustments may be performed using at least calculation methods and weighted values as disclosed elsewhere within this disclosure. Collectively, the fifth and sixth steps are shown as the HRTF generation step 404 in FIG. 9.

In an optional seventh step, the quality of the head-related transfer function may be evaluated in accordance with the quality control methods detailed elsewhere in this disclosure. The quality score of the transfer function as well as other details pertinent to the transfer function may be stored and transmitted to the end-user. In a further embodiment, the quality score may be immediately transmitted to the end-user for review. In this case, the first method may be paused to await confirmation or additional data from the user. In a further embodiment, the calculation performed in the calculation step may be iterated, i.e. performed again, using data supplied both in the data gathering step and in the quality evaluation step. This provides the benefit of reducing the amount of data needed in said steps as well as improving the quality and accuracy of the head-related transfer function. This step is shown as step 405 in FIG. 9.

In the eighth step, the HRTF is packaged for the user. Said packaging may comprise at least one Spatially Oriented Format for Acoustic (SOFA) file. The SOFA file may comprise multiple HRTFs. In an exemplary embodiment, the output SOFA file comprises HRIR data for both ears. Said HRIR data may be given in multiple directions of arrival for the audio signal, such as preferably 800-2200 different directions, in particular 836 or 1668 different directions. The HRIR impulse responses may be between 256-4096 samples long, in particular 1024 samples long. The sampling rate may be between 40-200 kHz, such as 48, 44.1 or 96 kHz, depending on the user preference. After packaging, the HRTF is transmitted to the user via at least one of the transmission methods disclosed elsewhere in this disclosure. The packing and transmitting step is shown as step 406 in FIG. 9.

In the ninth step, the user receives the HRTF. Advantageously the HRTF file may comprise automatically generated preprogrammed instructions to send at least a verification signal to the at least one first computer program. The verification signal provides the benefit of ensuring the user has received the HRTF and has been able to use it with their equipment. Responsive to the verification signal, the user may be sent further instructions or communications regarding the HRTF. The HRTF may be received by the user via at least one of the following methods: at least one processing device, audio equipment, a hyperlink, credentials to access a web-based storage, electronic media such as USB-drive. In a particularly advantageous embodiment, the user is provided with multiple copies of the HRTF for use with multiple audio equipments. Such copies may be adjusted in accordance with the details of the said multiple audio equipments as outlined in this disclosure.

After the completion of the first or second method, the user is in possession of their personalized head-related transfer function as shown in FIG. 9 as step 407. The second computer program application may provide the user with routines or methods for evaluating the head related transfer function. In a further exemplary embodiment, the user may utilize a computer program application or additionally at least one device comprising a microphone in conjunction with at least preprogrammed test signal to obtain further data relating the performance of the HRTF, which is then sent to the at least one first computer program application and analysed according to at least some of the criteria disclosed elsewhere in this disclosure. The user may then receive an updated version of the HRTF. In addition, the head-related transfer function may be advantageously updated periodically, for example annually, as the user biology typically changes with age. The first computer program application may provide the user with reminders regarding such an update. In a further exemplary embodiment, the updating of the HRTF and the use of the updated HRTF within audio equipment such as headphones may be done autonomously, initiated by at least one of: the audio equipment, the first computer program application, the second computer program application.

In at least one second method, in accordance with the present disclosure, the user may access resources stored on a server to initiate the acquisition of the personalized HRTF. At least some elements and steps of the first method, as disclosed above, are usable within the context of the second method as well.

In the second method, the user may access HRTF-related content via the internet. In a further exemplary embodiment, the access may be provided via a secured webpage. In a further exemplary embodiment, the resources are provided by the at least one first or second computer program application. In a further exemplary embodiment, the user may first provide basic information about the user as well as verify their contact details and optionally the data before accessing the HRTF-related content. The verification procedure, usable at this step or any other step of the methods described herein, provides the benefit of reducing erroneous data input into the calculation as well as reducing the possibility of the user location, age or other HRTF-related data being incorrect.

After the user has performed the above-mentioned provision of information, the user may be provided with instructions relating to the HRTF, for example how to obtain or measure data relating to the HRTF. These instructions may be provided in a static manner, for example in a textual or videographic format, or beneficially in an interactive manner, wherein the user is guided throughout the process with repetition provided at necessary points where the user may be experiencing issues. Such instructions again are beneficial for at least the reason that the input data of the HRTF may be greatly improved by the use of approved capture methods.

In at least some embodiments in accordance with the first or second methods, after the user has provided their details, a measurement kit comprising measurement devices in accordance with this disclosure may be sent, transmitted, or fabricated to or by the user. Such an action may be beneficially accomplished in an automated fashion to reduce the need for human labour and eliminate errors.

In accordance with the second method, the user may provide said data to the receiving program, which may comprise at least one first or second computer program application and/or the server application, via e.g. a web page. Said data provided by the user may be subjected to quality checks autonomously by the receiving program upon completion of the data transfer. In a further exemplary embodiment, the receiving program may autonomously send a verification message to the user that the data is in an acceptable state for generation of the HRTF. Calculation and/or generation of the HRTF may be accomplished utilizing at least in part calculation methods or steps discussed elsewhere in this disclosure.

In accordance with the second method, the receiving program may be configured to generate, adjust, modify, package and transmit the HRTF to the user in accordance with the corresponding steps as outlined with respect to the first method. In a particularly advantageous exemplary embodiment, the HRTF is uploaded, installed, transmitted or packaged with audio equipment such as headphones which are then delivered to the user by a delivery service such as the postal service. This has the benefit of providing customized headphones to the user with the benefits of improved audio quality as discussed elsewhere in this disclosure. The audio equipment may also be in a commercial enterprise, such as a store, in the user's vicinity and the HRTF of the user is automatically or optionally manually uploaded into the headphones. This minimizes the wait time for the user and provides better audio quality than mere store-bought headphones. In a further exemplary embodiment, the user HRTF is transmitted electronically and the user may test several pairs of audio equipment using their own HRTF.

In at least some embodiments in accordance with the present disclosure, at least some of the computer program applications may comprise payment modules. Such a payment module may comprise an API, a subroutine, or another means to facilitate collecting electronic payment from a user. The payment status of the user may be attached to the user data and used in different ways, e.g. used in part to allocate computational resources to the HRTF or as confirmation payment has been received before the calculation process has been initiated.

In the context of this disclosure, HRTF-related content may comprise at least: instructions or directions relating to the data gathering process, quality data relating to the data gathering process, communications with a person assisting in the data gathering process.

FIG. 10 shows an exemplary embodiment as follows: step 501 comprises calculating, by a first computer program application, a head-related transfer function for a user, the calculation based at least in part on gathered data comprising at least video material and at least one supplemental image, the at least one supplemental image comprising an image of a transparent measurement device superimposed over at least one biological detail of an user, and in step 502 said head-related transfer function is transmitted, e.g. to a user.

In some embodiments, the computer program applications are executed by computing devices, said devices each comprising at least one processing core. The computing devices may be, for example at least one of the following: a personal computer (PC), a mobile phone, a smart phone, a smart watch, a tablet computer, a server, node or cloud computing device. Comprised in the computing device is a processor, which may comprise, for example, a single- or multi-core processor wherein a single-core processor comprises one processing core and a multi-core processor comprises more than one processing core. The processor may comprise more than one processor. A processing core may comprise, for example, a Cortex-A8 processing core by ARM Holdings or a Steamroller processing core produced by Advanced Micro Devices Corporation. The processor may comprise at least one Qualcomm Snapdragon and/or Intel Core processor, for example. The processor may comprise at least one application-specific integrated circuit, ASIC. The processor may comprise at least one field-programmable gate array, FPGA. The processor may be a means for performing method steps in the computing device. The processor may be configured, at least in part by computer instructions, to perform actions.

In some embodiments, a network is used to facilitate communication to and from computing devices and second computing devices and other elements. Usable network technologies in accordance with the disclosure comprise at least: wireless local area network, WLAN, Ethernet, universal serial bus, USB, and/or worldwide interoperability for microwave access, Bluetooth, WiMAX, standards, and satellite communication methods, for example. Alternatively or additionally, a proprietary communication framework may be utilized. In some embodiments, separate networks may be used for one or more of the following purposes: communication between computing devices and peripheral devices, communication between computing devices and servers, et cetera.

As stated above, in relation to the current disclosure, the head-related transfer function or any of the computer program applications disclosed herein may be adjusted according to various determination criteria comprising: preprogrammed instructions, communications received from other devices including the presence or absence of first or third party devices, elapsed time, preset time, measurements internal or external to the user body or user location, user inputs and timing, battery levels, network data, detected usage, planned usage or any combination thereof. Computer program applications or hardware units may also have preprogrammed activities or processes. These may be triggered based on the criteria listed above.

The disclosure and particularly the embodiments disclosed herein provide at least the following benefits: Instrumentation is simple and low-cost, as for example a standard mobile phone may be used. The data acquisition process is simple for the user and the acquisition can be taken in any room and it does not require the listener to sit still for a long time. Silence is not necessary. This method does not require the use of an anechoic room although it offers anechoic HRTFs. The methods disclosed herein eliminate the uncertainty related to placing the microphones in the listener's ears. The effects of listener movements do not play a role in the quality of the final result.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in audio engineering, sound mixing and aural calibration.

ACRONYMS LIST

AES Audio Engineering Society
AES* Advanced encryption standard
API Application programming interface
BEM boundary element method
FD finite difference method
FDTD finite difference time domain method
FEM Finite element method
HRIR Head-related impulse response
HRTF Head-related Transfer Function
LED Light emitting diode
OCR Optical character recognition
QR Quick response code
SOFA Spatially Oriented Format for Acoustics
USB Universal serial bus

REFERENCE SIGNS LIST

| | |
|---|---|
| 10 | User |
| 11 | Right ear of user |
| 12 | Left ear of user |
| 13 | Right shoulder of user |
| 14 | Left shoulder of user |
| 15 | Oral cavity of user |
| 16 | Head of user |
| 18 | Neck of user |
| 90 | Measurement device |
| 91 | Machine-readable scale on measurement device |
| 95 | Measurement device |
| 96 | Machine-readable scale on measurement device |
| 97 | Identifying means on measurement device |
| 200 | Audio producing device |
| 201 | Audio heard by right ear of user |
| 202 | Audio heard by left ear of user |
| 202a, 202b, 202c, 202d | Audio heard by left ear of user taking different paths to user ear |
| 401, 402, 403, 404, 405, 406, 407 | Steps of method |
| 501, 502 | Steps of method |

The invention claimed is:

1. A method comprising:
calculating, by a first computer program application, a head-related transfer function for a user, the calculation based at least in part on gathered data comprising at least video material and at least one supplemental image, the at least one supplemental image comprising an image of a transparent measurement device superimposed over at least one biological detail of an user,
transmitting said head-related transfer function.

2. The method according to claim 1, wherein the transmitting comprises:
loading the head-related transfer function into at least one audio device,
making the audio device available to the user.

3. The method according to claim 2, wherein the audio device comprises headphones.

4. The method according to claim 1, wherein an autonomous device is used to gather the data related to the user.

5. The method according to claim 1, wherein the first computer program application provides contextual instructions for the data gathering process.

6. The method according to claim 1, wherein said gathered data comprises metadata relating to the user, and wherein said metadata is received in the first computer program application separately from the video material and the at least one supplemental image.

7. The method according to claim 1, wherein said gathered data comprises at least one supplemental image of the user's left ear and at least one supplemental image of the user's right ear.

8. The method according to claim 1, wherein the head-related transfer function is calculated in the time domain by solving at least one wave equation.

9. The method according to claim 1, wherein the head-related transfer function is calculated in the frequency domain by solving at least one Helmholtz equation.

10. A method according to claim 1, wherein the transmitting comprises packaging the head-related transfer function into a SOFA file format.

11. The method of claim 1, wherein the transparent measurement device is pressed against the user's ear.

12. An apparatus comprising at least one processing core, at least one memory including computer program code, the at least one memory and the computer program code being configured to, with the at least one processing core, cause the apparatus at least to:
calculate a head-related transfer function for a user, the calculation based at least in part on gathered data comprising at least video material and at least one supplemental image, the at least one supplemental image comprising an image of a transparent measurement device superimposed over at least one biological detail of an user, and
transmit said head-related transfer functions.

13. An apparatus according to claim 12, wherein the transmission of the head-related transfer function comprises:
loading the head-related transfer function into at least one audio device,
making the audio device available to the user.

14. An apparatus according to claim 12, wherein the head-related transfer function is calculated in the time domain by solving at least one wave equation.

15. An apparatus according to claim 12, wherein the head-related transfer function is calculated in the frequency domain by solving at least one Helmholtz equation.

16. An apparatus according to claim 12, wherein the data related to the user has been gathered using an autonomous device.

17. The apparatus of claim 12, wherein the transparent measurement device is pressed against the user's ear.

18. A non-transitory computer readable medium having stored thereon a set of computer readable instructions that, when executed by at least one processor, cause an apparatus to at least:
calculate a head-related transfer function for a user, the calculation based at least in part on gathered data comprising at least video material and at least one supplemental image, the at least one supplemental image comprising an image of a transparent measurement device superimposed over at least one biological detail of an user,
transmit said head-related transfer function.

* * * * *